3,440,272
Ni/SILANE CATALYST IN HYDROGENATION OF ORGANIC COMPOUNDS
Emile Eugene Frainnet, Merignac, Raymond Jean Calas, Le Bouscat, and Yves Colleuille, Lyon, France, assignors to Rhone-Poulenc S.A. Paris, France, a corporation of France
No Drawing. Filed May 17, 1965, Ser. No. 456,548
Claims priority, application France, May 21, 1967, 975,304
Int. Cl. C07c 5/14, 29/00, 79/00
U.S. Cl. 260—468    5 Claims

ABSTRACT OF THE DISCLOSURE

Organic compounds containing carbon-carbon, carbon-oxygen, or nitrogen-oxygen unsaturation are reduced with hydrogen in the presence of a metallic nickel catalyst made by heating nickel chloride with triethylsilane.

---

This invention relates to the catalytic hydrogenation of organic compounds.

It is known to hydrogenate organic compounds with molecular hydrogen in the presence of metallic nickel obtained by the reduction of nickel oxide with molecular hydrogen or by the action of hydrogen on nickel formate. It is also known to use as hydrogenation catalyst nickel derived from the decomposition of nickel-aluminium alloys with sodium hydroxide (so-called Raney nickel). Various nickel salts and organometallic complexes of nickel may also be employed as hydrogenation catalysts. However, in many cases, the use of such catalysts necessitates high temperature and pressure conditions. Thus, when it is desired to hydrogenate an aromatic nucleus into an alicyclic nucleus, even if the more highly active catalysts, such as Raney nickel, are employed, it is necessary to operate at such pressures and temperatures that it is preferred, in order to avoid them, to use catalysts based upon precious metals (platinum, palladium, ruthenium) which are more active, but are also much more costly.

The use of high temperatures and pressures, which in itself constitutes a disadvantage, also often results in troublesome secondary reactions. For example, in the case of the hydrogenation of compounds comprising both unsaturated bonds and functional groups, the use of excessively severe operating conditions simultaneously produces the hydrogenation of unsaturated bonds and secondary reactions involving the functional groups (fission by hydrogenolysis and decarboxylation, for example), which sometimes greatly reduce the yield of the desired product.

It has now been found that finely divided nickel catalysts which are obtained by the action of triethylsilane on nickel chloride (hereinafter referred to as "Ni/silane") have a catalytic activity in hydrogenation reactions which is much greater than the of nickel catalysts previously employed. Consequently, the reactions which previously required the use of high pressures and temperatures, can be carried out by the new process under more moderate conditions, which affords the further advantage that better yields are obtained. Moreover, even in cases where hydrogenation is readily effected by the prior processes, the new process affords the advantage of giving higher reaction speeds, thus making it possible to treat much larger quantities of starting material in a given time. This is a particularly valuable advantage in continuous reactions in which the use of the Ni/silane catalyst makes it possible to obtain much more rapidly the particular degree of hydrogenation required.

Catalysts obtained by reduction of nickel salts by means of hydrogenoorganosilanes have been used by Orlov et al. [Z. Obsh. Khim., 32, 2526–30 (1962)] to catalyze the condensation of organic acids with hydrogenotriorganosilanes to produce the ester of the corresponding triorganosilanol with evolution of hydrogen, in accordance with the reaction:

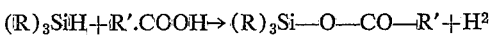

$(R)_3SiH + R'.COOH \rightarrow (R)_3Si-O-CO-R' + H_2$

These authors have also observed [Z. Obsh. Khim., 33, 1934–8 (1963)] that, when an unsaturated acid such as crotonic or maleic acid is employed, the nascent hydrogen evolved reduces the double bond and the ester of the corresponding saturated acid is obtained. Likewise, when the reaction is carried in an unsaturated solvent, such as, for example, hex-l-ene, this solvent is partially reduced, e.g., to hexane by the nascent hydrogen. In these reductions, the hydrogen is derived only from the hydrogenosilane, and no case of hydrogenation using this nickel as catalyst with separately added molecular hydrogen has been described, and there was nothing to suggest that the nickel possessed remarkable catalytic activity.

According, therefore, to the present invention, a process for the reduction of an organic compound comprises contacting the compound with gaseous hydrogen in the presence of a nickel catalyst produced by reducing nickel chloride to metallic nickel with triethylsilane.

The Ni/silane catalyst employed in the new process may be prepared by heating nickel chloride with triethylsilane under reflux, the latter being used in a quantity at least equal to the quantity theoretically required to reduce the nickel chloride to metallic nickel, and the heating being maintained at least until all evolution of gas ceases. A suspension of Ni/silane in an organosilicon phase is thus obtained which may be directly used for the hydrogenation. It is also possible to separate the catalyst from the organosilicon compounds by any appropriate operation, for example by decantation, filtration or distillation. In another method of carrying out the process, the Ni/silane catalyst may be employed as a suspension in an inert organic phase (e.g. petroleum oil or decalin), which may readily be obtained by adding this inert diluent to the product of the reaction and eliminating the organosilicon compounds present by distillation.

The quantity of catalyst employed varies with the compound to be hydrogenated and the operating conditions. Generally, 4–6% of nickel by weight of the organic compound is suitable. In some cases, however, very good results are obtained with smaller proportions, for example 1%, and there is no reason, from the viewpoint of the performance of the reaction, why much larger quantities, for example 10%, may not be employed, though this is generally unnecessary.

The process of the invention may be used to reduce organic compounds containing unsaturated bonds or groups reducible by catalytic hydrogenation, e.g., compounds containing carbon-to-carbon, carbon-to-oxygen, or nitrogen-to-oxygen unsaturation, e.g., aromatic compounds and compounds containing carbonyl or nitro groups. It is also applicable to organic compounds comprising both unsaturated bonds and reducible groups. These organic compounds may belong to the aliphatic, alicyclic, aromatic or heterocyclic series. They may also be substituted by radicals or functional groups which are not reducible by catalytic hydrogenation, such as saturated hydrocarbon radicals, the hydroxyl as in alcohols and phenols, and the ester group.

The temperature and pressure of the hydrogenation will vary with the product to be reduced, and the reaction may be carried out in the presence or absence of a diluent or solvent which is inert under the reaction conditions.

Generally a temperature from 0° to 150° C. and a pressure from 1 to 100 atmospheres of hydrogen is used. The addition of a small quantity of an alkaline compound to the reaction medium sometimes considerably improves the extent and speed of hydrogenation. As alkaline compound, an alkali-metal hydroxide, for example sodium hydroxide or potassium hydroxide is generally employed.

The following examples illustrate the invention.

EXAMPLE 1

Into a three-necked, round-bottomed, 100 cc. flask provided with an inlet for inert gas and a reflux condenser, are introduced 0.5 g. of nickel chloride (corresponding to 0.228 g. of metallic nickel) and 8 cc. of triethylsilane.

The mixture is heated under reflux in a nitrogen atmosphere with good stirring. Gas consisting for the most part of hydrogen is evolved, and heating is continued for 2 hours. A suspension of catalyst is thus obtained which is transferred into a 250 cc. reactor mounted on a shaking frame. 42 cc. of cyclohexane and 4.202 g. of cis-cis-cycloocta-1,5-diene (0.04 mol.) are then added and hydrogen is passed into the mixture with stirring at a pressure of one atmosphere. Absorption of hydrogen begins immediately and continues rapidly at a temperature of 20° C. The progress of the reaction is followed by measuring the volume of hydrogen absorbed. The absorption ceases at the end of 49 minutes, and it is noted that the volume of hydrogen absorbed corresponds to the stoichiometric quantity necessary for complete conversion of the cyclooctadiene into cyclooctane. Infra-red spectrography shows that there is no product having an ethylenic bond in the reaction mass.

The same experiment is repeated, using as catalyst Raney nickel obtained by treating 0.5 g. of a nickel-aluminium-chromium alloy (50/48/2) at 50–60° C. with 10 cc. of 30% by weight sodium hydroxide solution, and then washing the nickel obtained, successively, with water, ethanol and cyclohexane. The hydrogen absorption is very slow. At the end of 2 hours, 45 minutes, only 90 cc. of hydrogen have been absorbed, which corresponds to only 5% hydrogenation of the cyclooctadiene.

EXAMPLE 2

A catalyst is prepared as in the preceding example from the same quantities of nickel chloride and triethylsilane. After heating the mixture under reflux for 2 hours, followed by cooling, 10 cc. of petroleum oil are added to the metallic nickel suspension, and the residual organosilicon compounds are removed by distillation at 80° C. under 0.4 mm. Hg. A suspension of Ni/silane catalyst is thus obtained which is transferred into hydrogenation reactor, to which are also added 40 cc. of ethyl alcohol, 5 cc. of cyclohexane and 4.21 g. of cycloocta-1,5-diene. The hydrogenation is carried out as in Example 1, while a parallel experiment is performed with a Raney nickel catalyst prepared as indicated in Example 1. The speed of absorption in each of the reactions is followed by the volume of hydrogen which has been absorbed and the corresponding time of absorption. From these observations, the time necessary for the absorption of amounts of hydrogen corresponding to 25%, 50%, 75% and 100% of the stoichiometric quantity, can be estimated. The results obtained are as follows:

| Catalyst | Quantity of hydrogen absorbed, Percent of stoichiometric amount | | | |
| --- | --- | --- | --- | --- |
|  | 25 | 50 | 75 | 100 |
| Ni/silane (min.) | 9 | 18 | 27 | 38 |
| Raney nickel (min.) | 21 | 42 | 81 | 145 |

It will be seen that with Raney nickel four times as long is required to obtain complete hydrogenation as with the catalyst of this invention.

EXAMPLE 3

Into a 250 cc. autoclave is introduced the Ni/silane catalyst in suspension in petroleum oil, prepared as in Example 2, and 45 cc. of ethyl alcohol, 1 cc. of a 10% sodium hydroxide solution is ethanol, and 10 g. of benzyl alcohol are added. The mixture is heated at 130° C. for 4 hours under a hydrogen pressure of 60–80 atmospheres. The reaction mass is then filtered and the filtrate is distilled. 7.9 g. of a fraction which distills at 82–83° C. under 15 mm. Hg are collected which contain, by chromatographic estimation, 95% of hexahydrobenzyl alcohol. The yield is 71%.

It is known that the hydrogenation of benzyl alcohol with platinised Raney nickel at 100° C., under a hydrogen pressure of 70 atmospheres, gives hexahydrobenzyl alcohol in a yield of only 20% [Nishimura, Bull. Chem. Soc. Japan, 32, 1155–7 (1959); C.A., 54, 19.532 g.].

EXAMPLE 4

A catalyst suspension in petroleum oil is prepared as in Example 2, starting with 2 g. of nickel chloride and 42 cc. of triethylsilane. In the presence of this catalyst, 18.4 g. of methyl terephthalate in 50 cc. of methylcyclohexane is hydrogenated, with heating at 135° C. under a hydrogen pressure of 50 atmospheres. The absorption of hydrogen is very rapid and ceases after 40 minutes. Measurement of the volume of hydrogen absorbed indicates that hydrogenation of the methyl terephthalate to methyl hexahydrophthalate is complete.

A comparative test carried out under the same conditions, but using as catalyst 0.92 g. of a Raney nickel prepared as in Example 1, shows, on measurement of the volume of absorbed hydrogen, that only 30% of the methyl terephtalate has been hydrogenated in 40 minutes and that, if the hydrogen pressure is raised to 200 atmospheres, the extent of hydrogenation reached in this same time is still only 53%. The hydrogenation of methyl terephthalate in the presence of Raney nickel, in methanol, under a hydrogen pressure of 140 atmospheres at 160° C., has been described [J. Amer. Chem. Soc., 82,2551 (1969)], but under these conditions the yield at the end of 3–4 hours was only 70% of theory.

EXAMPLE 5

1.1 g. of nickel chloride is reduced with 18 cc. of triethylsilane as in Example 2 and suspended in 20 cc. of decalin. 10 g. of toluene diluted with 50 cc. of methylcyclohexane are hydrogenated in the presence of the catalyst so prepared, the hydrogen pressure in the autoclave being 20 atmospheres and the temperature 115–120° C. The hydrogenation of the toluene to methylcyclohexane is followed by the pressure drop corresponding to the absorption of hydrogen.

Two parallel tests are carried out with Raney nickel (5% calculated on the weight of the toluene), the hydrogenation being performed at temperatures of 120–130° and 150° C. respectively. The Raney nickel employed is the same as in Example 1.

The percentages of hydrogen absorbed in these operations in relation to the theory, are as follows:

| Catalyst | Temperature (°C.) | Extent of hydrogenation at the end of— | | | |
| --- | --- | --- | --- | --- | --- |
|  |  | 30 min. | 40 min. | 60 min. | 180 min. |
|  |  | Percent | Percent | Percent | Percent |
| Ni/silane | 115–120 | 47 | 100 |  |  |
| Raney Ni | 120–130 | 4 | 9 | 34 | 76 |
| Do | 150 | 26 | 83 | 100 |  |

It will be seen that under identical operating conditions 76% hydrogenation is obtained at the end of 3 hours with Raney nickel, while 100% hydrogenation is obtained at the end of 40 minutes with the process of the invention. In order to obtain a 100% hydrogenation with Raney nickel, it is necessary to raise the temperature to 150° C. (instead of 115°–120° C.), and even then it is only at the end of 60 minutes (instead of 40) that the hydrogenation is complete.

EXAMPLE 6

From 3.3 g. of nickel chloride and 54 cc. of triethylsilane, a suspension of Ni/silane catalyst in petroleum oil is prepared as described in Example 2. This catalyst is used for the hydrogenation of 30 g. of 3,3-dimethyl-butan-2-one (to 3,3-dimethyl-butan-3-ol) in 50 cc. of methylcyclohexane, in the presence of 3 cc. of a 10% sodium hydroxide solution in ethanol. A hydrogen pressure of 20 atmospheres is established in the autoclave and the temperature is gradually raised to 60° C. The absorption of hydrogen, which begins at ambient temperature, proceeds rapidly and ceases 30 minutes after the beginning of the heating.

When the same test is repeated, but with 1.5 g. of a Raney nickel catalyst similar to that of Example 1, the absorption of hydrogen takes place only at a temperature above 110° C., and is so slow that it takes 3 hours to obtain a 96% hydrogenation, although the temperature has been raised to 150° C. in the course of the reaction. The progress of the two reactions may be compared as follows:

| Catalyst | Temperature (°C.) | Extent of hydrogenation at the end of— | | | | |
|---|---|---|---|---|---|---|
| | | 10 min. | 20 min. | 30 min. | 60 min. | 120 min. |
| | | Percent | Percent | Percent | Percent | Percent |
| Ni/silane | 60 | 33 | 94 | 100 | | |
| Raney Ni | 110–150 | 0 | 3 | 14 | 58 | 96 |

EXAMPLE 7

Into a 250 cc. autoclave is introduced, a suspension of Ni/silane catalyst in petroleum oil as described in Example 5, 10 g. of phenol, 50 cc. of methyl-cyclohexane, and 1 cc. of a 10% sodium hydroxide solution in ethanol. A hydrogen pressure of 20 atmospheres is established and maintained and the mixture is gradually heated with good stirring. The hydrogen absorption, which begins at room temperature, is substantially complete at 90° C. It is found by ultra-violet spectroscopy that the product obtained contains only 0.015 g. of phenol, which corresponds to a yield of pure cyclohexanol above 99%.

A comparative test with 0.5 g. of Raney nickel similar to that of Example 1, also activated with 1 cc. of 10% sodium hydroxide solution in ethanol, gave the following results, compared with those of the process of the invention.

| Catalyst | Extent of hydrogenation at the end of— | | | |
|---|---|---|---|---|
| | 10 min. (35° C.)[1] | 20 min. (85° C.)[1] | 30 min. (130° C.)[1] | 40 min. (135° C.)[1] |
| Ni/silane, Percent | 23 | 97 | 100 | |
| Raney Ni, Percent | 0 | 8 | 69 | 100 |

[1] The temperatures are those obtained at the end of the time indicted.

These results show that the hydrogenation with Raney nickel starts much more slowly than with Ni/silane, since with the latter the hydrogenation reaches an extent of 23% at a temperature of 35° C., while with Raney nickel it does not begin at this temperature. After 20 minutes, when the temperature has reached 85° C., the extent of hydrogenation is substantially quantitative with Ni/silane, while with Raney nickel it is only 8%. In order to obtain a quantitative yield with latter, it is necessary to use a temperature of 135° C., and a duration of heating twice that necessary when using Ni/silane at a lower temperature.

EXAMPLE 8

A Ni/silane catalyst is prepared by reacting 1 g. of nickel chloride with 8 g. of triethylsilane with heating under reflux for two hours. The catalyst suspension thus obtained is used as such in the hydrogenation, under atmospheric pressure, of 0.1 mol. of hept-1-ene in the presence of 30 g. of decalin as solvent. At 22° C., the hydrogenation to give heptane is more than 99% complete in 15 minutes.

By proceeding with the same quantities of hept-1-ene and decalin in the presence of a catalyst obtained in a similar manner from 4 g. of nickel chloride, the hydrogenation is more than 99% complete in about 7 minutes.

These speeds of hydrogenation are very much higher than those observed with Raney nickel prepared from a Ni-Al alloy (50/50). Thus, in the presence of about 6 g. of Raney nickel, the hydrogenation of 0.1 mol, of hept-1-ene, carried out with ethanol (50 g.) as solvent, is approximately 99% complete at 21° C. only after 27 minutes.

EXAMPLE 9

With a Ni/silane catalyst prepared from 1 g. of nickel chloride and 8 g. of triethylsilane, 7.1. g. of cyclohexene are hydrogenated in the presence of 30 g. of decalin. At atmospheric pressure and 23° C., the hydrogenation to give cyclohexane is more than 99% complete in 16 minutes.

Substantially the same result is obtained if, instead of using the catalyst in the form obtained after reduction of the nickel chloride, the organosilicon compounds are first of all distilled off under reduced pressure after the addition of the decalin solvent.

If, on the other hand, instead of Ni/silane, 2 g. of Raney nickel prepared as in Example 8 are used as catalyst, it takes about 160 minutes to obtain the same degree of hydrogenation of 7.6 g. of cyclohexene, using 50 g. of ethanol as solvent, at 22° C. and atmospheric pressure.

EXAMPLE 10

A Ni/silane catalyst is prepared from 1 g. of nickel chloride and 8 g. of triethylsilane. This catalyst is employed as such, without removal of organosilicon derivatives present, to hydrogenate 0.1 mol. of allylbenzene in the presence of 30 g. of decalin. Under atmospheric pressure and at 22° C., the hydrogenation to propylbenzene is complete at the end of 15 minutes.

EXAMPLE 11

A Ni/silane catalyst is prepared from 1 g. of nickel chloride and 8 g. of triethylsilane. Without removal of the organosilicon derivatives present, 0.1 mol. of limonene is hydrogenated under atmospheric pressure in the presence of 30 g. of Decalin. It is found that the two double bonds of the limonene are readily hydrogenated. The hydrogenation curve exhibits no point of inflexion in its steep slope when the quantity of hydrogen absorbed reaches half the value corresponding to the formation of paramenthane. The complete hydrogenation to paramenthane is more than 99% complete in 75 minutes.

With Raney nickel such as that of Examples 8 and 9 even in considerable quantities, employing ethanol as solvent and operating in the presence of a little sodium hydroxide, it is easy to stop the reaction at the carvomenthene stage and difficult to go beyond this stage.

We claim:
1. Process for the reduction of an aliphatic, alicyclic, or aromatic organic compound containing carbon-carbon, carbon-oxygen, or nitrogen-oxygen unsaturation, which comprises contacting the compound at 0–150° C. with gaseous hydrogen at a pressure of 1 to 100 atmospheres in the presence of 1–10% by weight of the said compound of a metallic nickel catalyst produced by heating nickel chloride with triethylsilane under reflux, using a quantity of triethylsilane at least equal to the quantity theoretically required to reduce the nickel chloride to metallic nickel, the heating being maintained at least until all evolution of gas ceases.

2. Process for the reduction of an aromatic compound to the corresponding saturated alicyclic compound which comprises contacting the said aromatic compound at 0–150° C. with gaseous hydrogen at a pressure of 1 to 100 atmospheres in the presence of 1 to 10% by weight, based on the said aromatic compound, of a metallic nickel catalyst produced by heating nickel chloride with triethylsilane under reflux, using a quantity of triethylsilane at least equal to the quantity theoretically required to reduce the nickel chloride to metallic nickel, the heating being maintained until all evolution of gas ceases.

3. Process according to claim 1 wherein the weight of the nickel catalyst is 4 to 6% of the weight of the said unsaturated organic compound.

4. Process according to claim 1 in which the reaction is carried out in the presence of sodium hydroxide.

5. Process according to claim 2 in which the reaction is carried out in the presence of sodium hydroxide.

References Cited

Orlov et al., Z. Obsh. Khim. 32 2526–30 (1962).

JAMES A. PATTEN, *Primary Examiner.*

PAUL J. KILLOS, *Assistant Examiner.*

U.S. Cl. X.R.

260—666, 675.5, 668, 683.9, 638, 631, 617, 667; 252—431